Nov. 3, 1925.  1,559,717
G. A. LIPPINCOTT
METHOD OF AND MEANS FOR CUTTING BLANKS FROM IRREGULAR SURFACED MATERIAL
Filed May 9, 1922   3 Sheets-Sheet 1
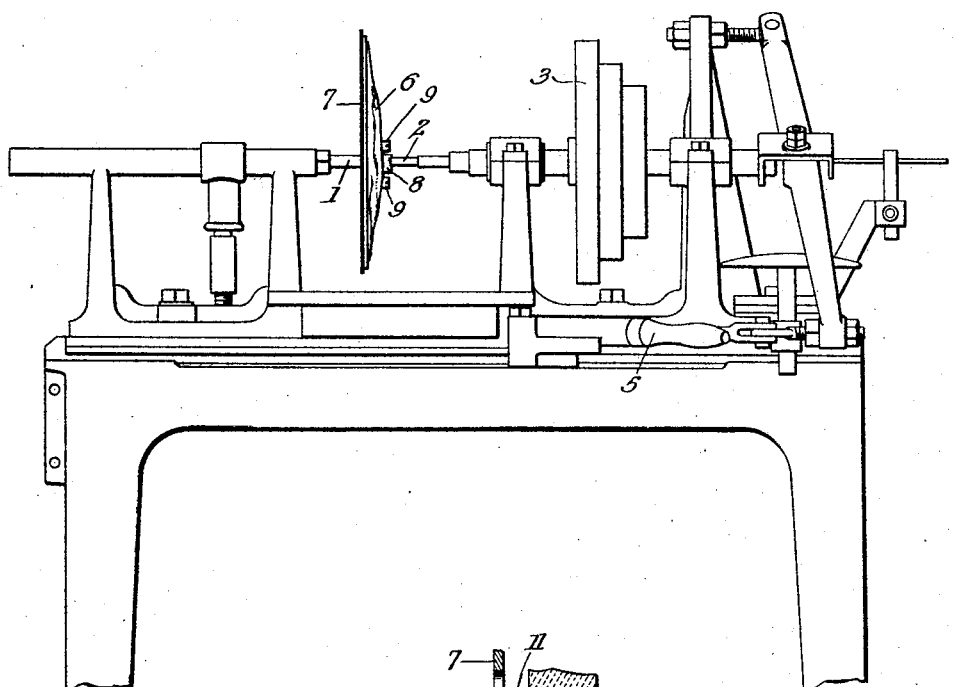
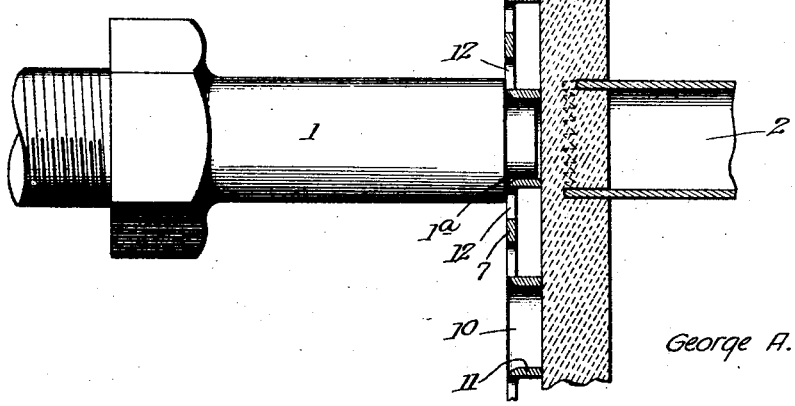
Inventor
George A. Lippincott
By Cushman, Bryant & Darby
Attorneys

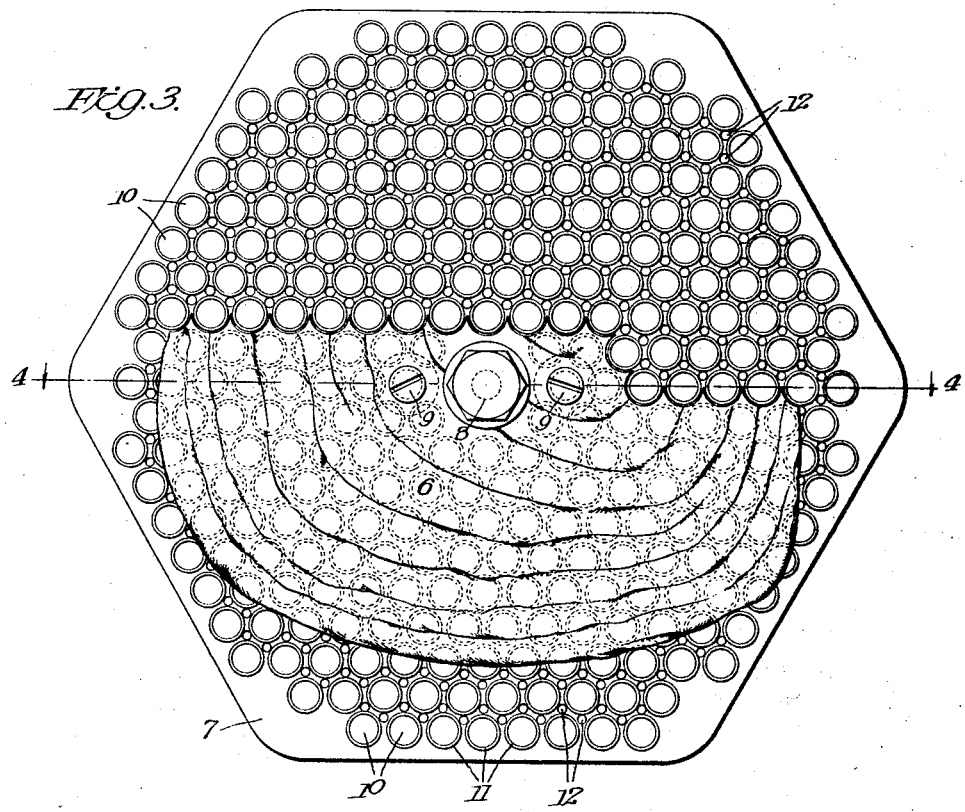
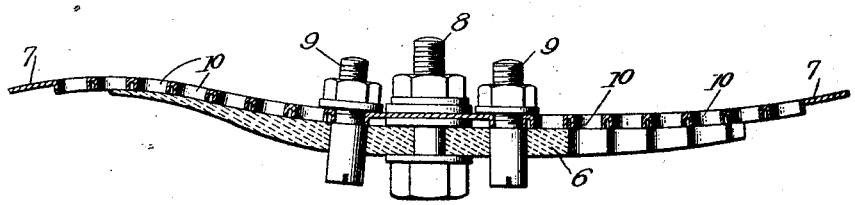
George A. Lippincott

Nov. 3, 1925.  1,559,717
G. A. LIPPINCOTT
METHOD OF AND MEANS FOR CUTTING BLANKS FROM IRREGULAR SURFACED MATERIAL
Filed May 9, 1922    3 Sheets-Sheet 2
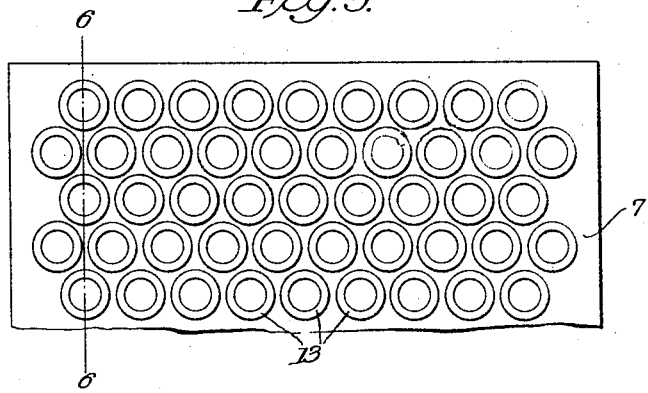
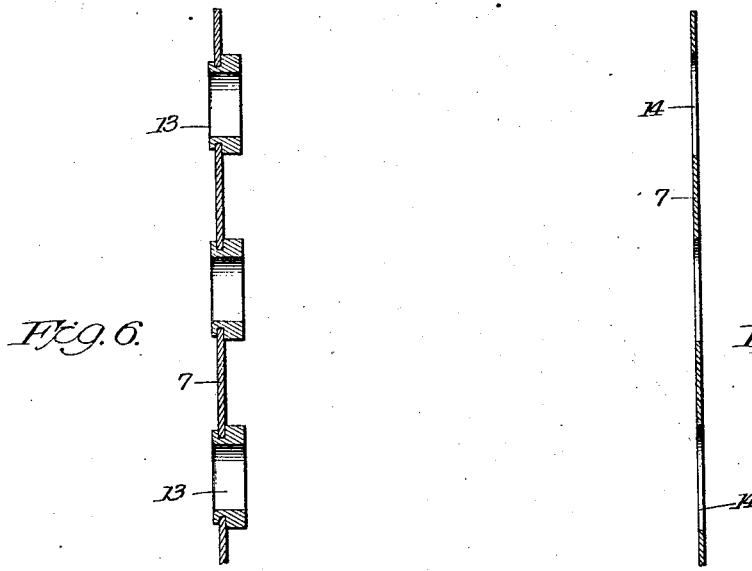
Inventor
George A. Lippincott
By Cushman, Bryant & Darby
Attorney Patented Nov. 3, 1925.

1,559,717

UNITED STATES PATENT OFFICE.

GEORGE A. LIPPINCOTT, OF PHILADELPHIA, PENNSYLVANIA.

METHOD OF AND MEANS FOR CUTTING BLANKS FROM IRREGULAR-SURFACED MATERIAL.

Application filed May 9, 1922. Serial No. 559,677.

*To all whom it may concern:*

Be it known that I, GEORGE A. LIPPINCOTT, a citizen of the United States, residing at Philadelphia, in the county of Philadelphia and State of Pennsylvania, have invented new and useful Improvements in Methods of and Means for Cutting Blanks from Irregular-Surfaced Material, of which the following is a specification.

The present invention relates to improvements in a method of and means for use in cutting blanks from material having a face of irregular contour. In particular the invention is applicable to the treatment of "pearl" shells in the production of blanks for buttons and other purposes and will, therefore, be herein described in connection with means commonly employed in that art.

Among the objects of the invention is to provide a method and means by which a maximum number of blanks may be cut from a single shell, the amount of waste being considerably less than that which results from using the methods and means commonly employed.

Another object of the invention is to avoid the necessity for employing skilled labor. By the method and means hereinafter described unskilled labor may be employed to rapidly produce blanks from a given shell with a minimum amount of waste of the material, all of the blanks being cut so that each will present a face containing all the lustre of the shell from which it is obtained.

With the foregoing and other objects in view, the invention involves the use of a template of flexible material adapted to be securely connected with a piece of shell and to accurately guide the cutter of any well known type of button blank forming machine so that a series of duplicate blanks may be readily cut, the connected template and shell being accurately positioned after each cutting operation.

In the accompanying drawings:—

Fig. 1 is an elevation of a button cutting machine and parts embodying the present invention;

Fig. 2 is a view partly in section, on an enlarged scale, of the back peg and cutter of the machine and a template embodying the present invention associated therewith;

Fig. 3 is an elevation of the improved template showing the same attached to a shell which has been partially cut;

Fig. 4 is a transverse section substantially on the line 4—4 of Figure 3;

Fig. 5 is an elevation of a portion of a slightly modified form of template;

Fig. 6 is a sectional view on an enlarged scale, substantially on the line 6—6 of Figure 5, and Fig. 7 is a detail section of another modification.

Referring to the drawings, and particularly to Fig. 1, the machine illustrated comprises a suitable frame-work on which is mounted a substantially horizontal back peg 1, with which is adapted to cooperate a tubular cutter 2 having a toothed or saw-like cutting edge at its free end. The cutter is mounted in suitable bearings on the frame of the machine and rotated at the desired speed by suitable driving means including pulleys 3, a hand lever 5 being provided for moving the cutter axially toward and from the back peg 1, so as to cut blanks from a shell 6, which is held by the operator in proper position.

It will be understood that the present invention is not in any sense limited to the use of any particular type or form of blank cutting means, and Fig. 1 illustrates merely conventionally a well-known and common form.

In carrying out the present invention a template 7 is rigidly connected with the shell 6 to be cut, as by bolts 8 and 9 and suitable nuts screwed thereon, so that relative movement between it and the shell is prevented and said template is provided with means for accurately guiding the cutter, 2, so that it will operate to properly cut the desired blanks from the shell 6.

As shown, the template 7 is formed of a relatively thin, flexible, metal plate, which, by the action of the securing means above referred to, will be caused to conform closely to any irregularity in the surface of the shell against which it is secured and the apertures 10 in the plate are of such shape and size that they will readily fit over the free end of the back peg 1 of the cutting machine. As shown in Figure 2, such free end of the back peg is preferably reduced somewhat in diameter to provide a shoulder $1^a$ against which a face of the template 7 bears.

In the embodiment of the invention shown in Figs. 2 to 4 inclusive, the apertures 10 are punched from the body of the template plate 7 and thus provide a series of annular, ring-shaped, projections 11 on the face of the template which is secured against the shell 6. Each of such projections is of the form and size of the blank to be cut and the tubular cutter 2 passes thereover as it severs the blank from the shell 6.

It will be seen that the apertures 10 are arranged relatively close together so that a maximum number thereof are provided in a given area and, as these are successively positioned on the back peg 1 while the cutter is moved to and from cutting relation with the shell, there will be a minimum waste of material produced by cutting a maximum number of blanks from any particular piece of shell.

It will be observed, referring particularly to Figure 2, that when the template 7 is assembled with the shell 6, that the shell rests upon the tops of the projections 11, so as to space the shell 6 from the template, leaving an interspace between the shell and the body of the template. With this arrangement of template and shell, there will be a clearance for the cutter provided by the interspace between the blank and the body of the template, so that the cutter 2, as it passes over the projection 11 to sever the shell, can make such complete severance without danger of the cutter teeth engaging or contacting with the template and becoming dull or injured.

As the template 7 is flexible and adapts itself to irregularities in the surface of the shell to which it is applied, the shell is always positioned in such relation to the cutter that the cut will be parallel with the grain or layer of the shell and the face of each blank will show all of the shell lustre.

In carrying out the improved method the operator first secures the template 7 to the shell to be cut by means of the bolts 8 and 9 and then positions one of the openings 10 on the back peg 1 and properly manipulates the handle 5 to move the cutter 2 toward said peg. As soon as the cutter has severed a blank from the shell the handle 5 is manipulated to withdraw the cutter and the operator shifts the template and attached shell to position another opening 11 on the back peg; after which the cutting operation is repeated. By this method the template and shell are rapidly shifted from one position to another and the shell accurately positioned with relation to the cutter axis so that blanks of the desired character are produced. The means or devices for securing the template to the shell are arranged approximately at the center of the template and, therefore, practically all of the shell can be cut into blanks. Whenever desired the template can be readily disengaged from the shell and applied to another.

As shown in Figs. 2 and 3, a series of perforations 12 are formed through the body of the template about all except the outer projections 11 thereon, this construction reducing the weight of the template plate and rendering it more flexible, as well as assisting in the escape of small particles of cut shell, dust, etc.

Of course, the pieces of shell to be cut will vary considerable in size and in case it is desired to cut a piece having a greater area than the template, the latter can be detached from the shell and again secured thereto in a different position after a number of blanks have been produced.

Instead of forming the openings 10 in the template by punching, there may, as shown in Figs. 5 and 6, be secured within each of said openings a short sleeve 13, the ends of which are upset to secure the sleeves to the body of the plate, said sleeves projecting beyond the face of the plate against which the shell to be cut is secured and such projecting ends corresponding in shape and dimensions to the blanks to be cut.

While it is preferred to thus provide the template with a series of projections, each corresponding in form and size to the blanks to be cut, it is possible to simply provide the flexible metal plate 7 with apertures 14 of a size capable of receiving the back peg 1, the body of the latter being provided with an annular groove into which the cutting edge of the cutter 2 will extend after it has severed a blank from the shell, such form of back peg being well known in the art.

It is thought that the invention will be clearly understood from the foregoing description and the drawings.

It will be seen that by securing a flexible template to the irregular surfaced material to be cut it is possible to always present such material to the cutter so that the cut will be parallel to the grain of the shell, for example, and also that no skill is required to position the material to be cut between the cutting operations so as to avoid waste of material. The openings in the template furnish positive guides for accurately positioning the material between cutting operations and insure that the maximum possible number of blanks can be produced from a shell, for example, of certain area.

The template is inexpensive and durable and may be quickly secured to or detached from the material to be cut.

In the foregoing description I have referred particularly to the use of the invention in the manufacture of pearl button blanks, but it will be evident that it is not necessarily limited to this particular art.

For example, the template can be employed with advantage in the cutting of blanks from material other than shell, particularly where one of the faces of such material is of irregular contour.

As shown, the template is applied to the "face" of the shell to be cut, but, if desired, it can be applied to the back surface, and, furthermore, if desired, the template might be so constructed as to serve as a direct guide for the cutter instead of being applied to the back peg and thus indirectly guiding the cutter as hereinbefore described.

I claim:

1. The herein described method of cutting blanks from material having a face of irregular contour, comprising securing against one face of the material a template having a series of means for engaging a suitable support, said means being arranged as close together as the size of the blank to be produced will permit, and the material of the template being such as to permit it to conform to irregularities in the contour of the surface to which it is applied, successively positioning the support engaging means on a suitable support, and effecting relative movement between a cutting tool and the material on a path co-axial with the support.

2. The herein described method of cutting blanks from material having a face of irregular contour comprising securing an apertured template against said face so that it conforms to the irregularities thereof, and cutting through the material from the face opposite that against which the template is arranged in alignment with the peripheries of the apertures in the template.

3. A template for use in cutting blanks from a shell comprising a plate of flexible material provided with means adapted to co-operate with a suitable support to successively position different portions of a shell to which it is secured in axial alignment with a tubular cutter, and means for securing said plate to a shell and causing it to conform to irregularities of the surface against which it is secured.

4. A template for use in cutting blanks from a shell comprising a thin metal plate, adapted to be secured against the shell to be cut and to conform to irregularities in the surface on which it bears, said plate being provided with a series of apertures each surrounded on a face of the plate, that is to bear against the shell by a slight annular projection having the form and dimensions of the blanks to be cut.

5. A template for use in cutting blanks from a shell, comprising a flexible plate adapted to bear against a shell to be cut and to conform to irregularities in the surface on which it bears, said plate being provided with a plurality of means for successively engaging a suitable support, a plurality of bolts each having a head at one end and a threaded stem projecting from said plate and adapted to extend through bores formed in the shell, and nuts engaging the threaded stems of the bolts and adapted to cause the plate to bear close against and conform to the contour of the adjacent shell surface.

6. A template for use in cutting blanks from a shell comprising a flexible plate, having a series of apertures formed therein, the body of the plate forming an integral ring, of the form and dimensions of the blanks to be produced, about each aperture on one face, and means for securing said plate to a shell with said projecting rings in contact with the shell.

7. A template for use in cutting blanks from a shell, comprising a flexible plate provided on its face with a series of projections of substantially the form and dimensions of the blanks to be produced, and means for securing said plate to a shell with the shell resting upon said projections and spaced from the body of the template to give tool-clearance space between the shell and the body of the template.

8. A template for use in cutting blanks from a shell comprising a flexible plate provided on its face with a series of projections of the form and dimensions of the blanks to be produced, the body of the plate between said projections having perforations to increase its flexibility and give chip clearance openings, and means for securing said plate to a shell with the shell resting upon said projections and spaced from the body of the template to give tool-clearance between the shell and the body of the template.

In testimony whereof I have hereunto set my hand.

GEORGE A. LIPPINCOTT.